(12) United States Patent
Fino

(10) Patent No.: US 9,277,309 B2
(45) Date of Patent: Mar. 1, 2016

(54) DETACHABLE WIRELESS LISTENING DEVICE

(75) Inventor: Jorge S. Fino, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1154 days.

(21) Appl. No.: 13/074,349

(22) Filed: Mar. 29, 2011

(65) Prior Publication Data
US 2012/0250914 A1 Oct. 4, 2012

(51) Int. Cl.
| H04R 25/00 | (2006.01) |
| H04R 1/10 | (2006.01) |
| H04M 1/60 | (2006.01) |
| H04R 5/033 | (2006.01) |

(52) U.S. Cl.
CPC .......... *H04R 1/1033* (2013.01); *H04M 1/6066* (2013.01); *H04R 1/1025* (2013.01); *H04R 1/1041* (2013.01); *H04R 5/033* (2013.01); *H04R 2420/05* (2013.01); *H04R 2420/07* (2013.01)

(58) Field of Classification Search
CPC ...... H04R 1/10; H04R 1/1025; H04R 1/1033; H04R 1/1041; H04R 5/04; H04M 1/6058
USPC ........................................................ 381/384
See application file for complete search history.

(56) References Cited

U.S. PATENT DOCUMENTS

| 5,590,417 | A | 12/1996 | Rydbeck |
| 7,187,948 | B2 * | 3/2007 | Alden ............................. 455/557 |
| 7,840,242 | B2 * | 11/2010 | Yoshino ..................... 455/575.2 |
| 7,877,115 | B2 | 1/2011 | Seshadri et al. |
| 8,401,219 | B2 * | 3/2013 | Hankey et al. ................. 381/384 |
| 2002/0030744 | A1 | 3/2002 | Sawachi |
| 2006/0068857 | A1 | 3/2006 | Asseily |
| 2006/0281477 | A1 | 12/2006 | Downes |
| 2007/0041582 | A1 | 2/2007 | Lam |
| 2007/0054706 | A1 | 3/2007 | Liu |
| 2008/0057857 | A1 * | 3/2008 | Smith .......................... 455/3.05 |
| 2008/0152160 | A1 | 6/2008 | Chew et al. |
| 2010/0265179 | A1 * | 10/2010 | Ram .............................. 345/163 |
| 2011/0026634 | A1 | 2/2011 | Hsu et al. |

FOREIGN PATENT DOCUMENTS

| EP | 1 622 415 A1 | 2/2006 |
| EP | 1 624 586 A1 | 2/2006 |
| WO | WO 2007/035021 A | 3/2007 |
| WO | WO 2008/028175 A2 | 3/2008 |
| WO | WO 2009/136926 | 11/2009 |

OTHER PUBLICATIONS

PCT International Preliminary Report on Patentability for PCT/US2012/024536, mailed Oct. 10, 2013.
International Search Report and Written Opinion for PCT/US12/24536 dated May 21, 2012.
European Search Report, EP 12 16 1914, Jul. 4, 2012, 6 pgs.

* cited by examiner

*Primary Examiner* — Duc Nguyen
*Assistant Examiner* — Kile Blair
(74) *Attorney, Agent, or Firm* — Blakely, Sokoloff, Taylor & Zafman LLP

(57) ABSTRACT

Broadly speaking, the embodiments described herein relate to a media apparatus that can be used in conjunction with a host device to provide an end user a pleasurable listening experience especially during periods of physical activity. In the described embodiments, the host device can take the form of a portable media player. In particular, the media apparatus can include a listening device.

18 Claims, 11 Drawing Sheets

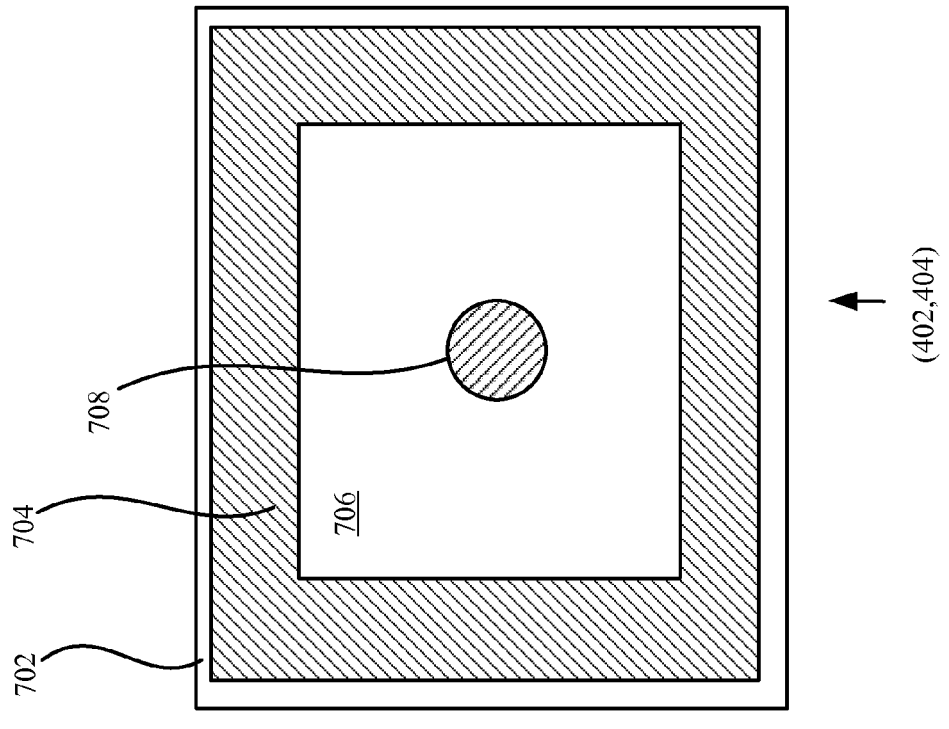
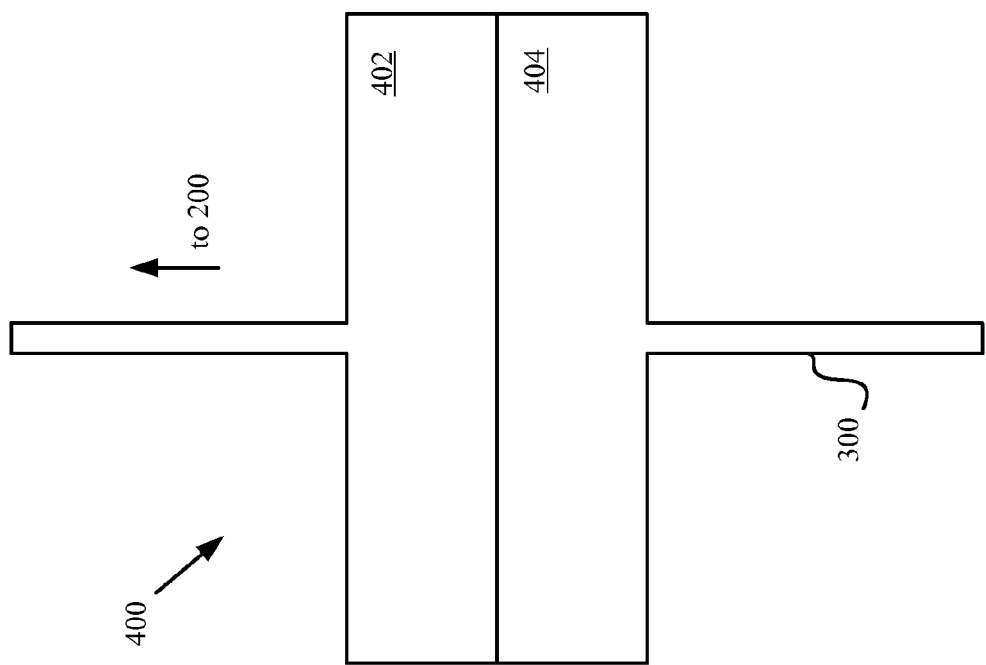
FIG. 3B
FIG. 3A

DETACHABLE WIRELESS LISTENING DEVICE

FIELD OF THE DESCRIBED EMBODIMENTS

The described embodiments relate to a listening device that allows an end user to comfortably listen to an audio output of a portable media player. In particular, the listening device can be easily worn without inconveniencing the end user during physical activity.

DESCRIPTION OF THE RELATED ART

Personal media players have become ubiquitous in that they can provide an end user with a great amount of multimedia information wherever and whenever desired. One of the great advantages to the end user of the personal media player is that the personal media player can be carried about for use in any number of different venues at any time while the end user engages in various physical activities. A signal wire in the form of a cord is generally used to transmit an audio signal from the personal media player to a wearable listening device, such as an ear bud. Cords transmit the audio signal more effectively, require less power, are inexpensive and are simpler to implement than wireless transmission techniques.

However, as simple and efficient as the cord may be in transmitting the audio signal, the cord is susceptible to becoming entangled while the end user is participating in physical activity. This is particularly nettlesome since the cord connected to the personal media player used while exercising or worn on the body requires frequent adjustment to avoid entanglement which can prove distracting or in some cases present a hazard to the end user.

Therefore, what is desired are improved techniques for listening to audio provided by a personal media player during physical activity.

SUMMARY

Broadly speaking, the embodiments disclosed herein describe at least a media apparatus that provides an end user of a personal media player a pleasurable listening and unencumbered experience during physical activity.

In one embodiment, a media apparatus is described. The media apparatus includes at least one listening device, a corded portion in communication with a host device arranged to provide an audio signal, and a detachable connector having a first part and a second part. In the described embodiment, the detachable connector is arranged to detachably couple the at least one listening device at the first part to the corded portion at the second part. When the listening device is attached to the corded portion by way of the detachable connector, the listening device receives at least the audio signal from the host device by way of the corded portion and when the listening device is detached from the corded portion, a wireless signal that includes the audio signal is transmitted from the second part of the corded portion for reception at the first part of the listening device.

In one aspect of the described embodiment, the corded portion acts as an RF antenna arranged to receive an RF signal transmitted from an external RF transmitter and passes the received RF signal to the host device for processing. Furthermore, when the host device is receiving power from an external power supply, the corded portion passes power directly from the host device to the listening device by way of the detachable connector.

In another embodiment, a portable media device is disclosed. The portable media device includes at least a processor, a data store arranged to retain at least a media item, the processor arranged to process the media item to form an audio signal, a data port arranged to receive a cord and arranged to at least output the audio signal to the cord, a wireless transmission module arranged to condition the audio signal in accordance with a wireless transmission protocol, and an attachment detector, the attachment detector arranged to detect if the cord is attached to a listening device arranged to present an audible output of the audio signal. When the attachment detector detects that the cord is not attached to the listening device, the processor instructs the transmission module to condition the audio signal in accordance with the wireless protocol and wirelessly transmit the conditioned audio signal.

In still another embodiment, a method performed by a processor in a portable media player arranged to process and store at least a media asset is described. The method can be performed by processing the media asset by the processor, generating an audio signal as a result of processing the media asset and receiving a connection status from an attachment detector. When the connection status indicates that the portable media player is not connected to a listening device, then instructing a wireless transmission module to condition the audio signal in accordance with a wireless transmission protocol, and wirelessly transmitting the conditioned signal to the listening device by way of a corded portion.

In yet another embodiment, non-transitory computer readable medium for storing a computer program executed by a processor in a portable media player arranged to process and store at least a media asset is described. The computer readable medium including at least computer code for processing the media asset by the processor to form an audio signal, computer code for receiving a connection status from an attachment detector, computer code for instructing a wireless transmission module to condition the audio signal in accordance with a wireless transmission protocol by the processor when the connection status indicates that a corded portion attached to the portable media player is not connected to a listening device and computer code for using the corded portion to wirelessly transmit the conditioned signal.

Other aspects and advantages will become apparent from the following detailed description taken in conjunction with the accompanying drawings which illustrate, by way of example, the principles of the invention.

BRIEF DESCRIPTION OF THE DRAWINGS

The described embodiments will be readily understood by the following detailed description in conjunction with the accompanying drawings, wherein like reference numerals designate like structural elements, and in which:

FIGS. 3A-3B show embodiments of a detachable connector.

DETAILED DESCRIPTION OF THE DESCRIBED EMBODIMENTS

Figure 1:
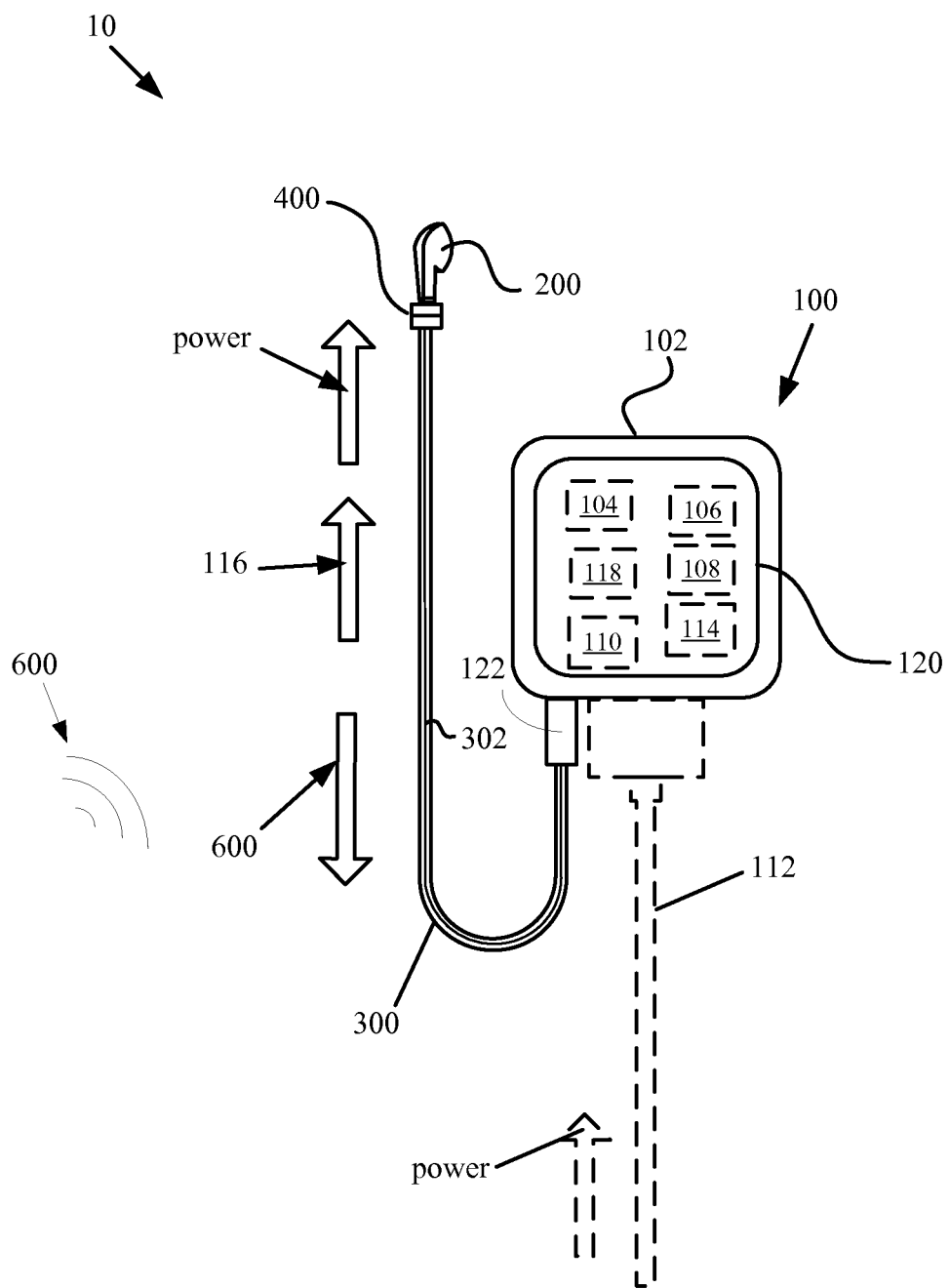
FIG. 1 is a block diagram of media apparatus in an attached configuration in accordance with the described embodiments.

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

The portable communication device described herein can be equipped to carry out various multimedia and other types of personal communication functions. In one embodiment, the portable communication device can take the form of a dedicated portable media player such as an iPod™ manufactured by Apple Inc. of Cupertino, Calif. arranged to process media assets such as video data and audio data such as MP3 files. The portable communication device can also take the form of a multi-function device along the lines of a smartphone such as an iPhone™ also manufactured by Apple Inc. of Cupertino, Calif.

In any case, the embodiments described herein relate to a media apparatus that can be used in conjunction with a host device to provide an end user a pleasurable listening experience especially during periods of physical activity. In the described embodiments, the host device can take the form of a portable media player. In particular, the media apparatus can include a listening device. The listening device can include a single listening component such as an ear bud(s) that can be detachably coupled to a corded portion by way of a detachable connector. The detachable connector can take many forms. For example, the detachable connector can be mechanical nature and rely upon a clip, fastener, and the like to secure the listening device to the corded portion. The listening device can also include more than one listening component. For example, a first listening component can take the form of a first ear bud and a second listening component can take the form of a second ear bud connected to each other by a cord. In this way, an end user can listen to audio at both ears. Furthermore, when the media apparatus and in particular the host device is multi-channel capable, then the first ear bud can provide a first audio output corresponding to a first audio channel and the second ear bud can provide a second audio output corresponding to a second audio channel. For example, the first and second audio channels can be a left and right audio channel consistent with two channel stereo audio.

In another embodiment, the detachable connector can be magnetic in nature. For example, the detachable connector can include a first part coupled to the listening device having at least a first magnetic element that exhibits a first magnetic polarity (i.e., either North magnetic polarity or South magnetic polarity). The detachable connector can also include a second part coupled to the corded portion having at least a second magnetic element that exhibits a second magnetic polarity opposite that of the first magnetic polarity. In this way, when the first and second parts are in proximity to each other, a net attractive magnetic force can be generated that can cause the first and second parts to magnetically attach to each other. In addition to the first and the second magnetic elements, the first and second parts can also include electrical contacts that can be used to create a conductive path between the first and second parts when the first and second parts are magnetically attached to each other. In this way, power and/or an audio signal can be passed from the host device to the listening device by way of the corded portion without interruption.

In another embodiment, the first part and the second part can include a wireless receiver and a wireless transmitter portion, respectively, that facilitates the establishment of a wireless communication channel between the listening device and the host device by way of the corded portion when the first and second parts are physically separate from each other. For example, when the host device is BlueTooth (BT)™ enabled, the host device and the listening device can identify each other according to the well-known BT pairing procedure. Once paired, the host device can retain a BT address associated with the listening device. It should be noted that in those cases where the listening device includes two listening components capable of projecting Left and Right audio channels in support of two channel stereo, then each listening component can have its own BT address associated therewith.

Once the pairing process between the host device and the listening device and the components associated therewith is completed, the host device can provide an appropriate wireless signal that can be received, recognized, and appropriately processed by the listening device and in particular the listening component(s). Accordingly, when the host device detects that the first and second parts of the detachable connector are physically separated from each other, the host device can immediately activate a wireless module incorporated within the host device and begin wirelessly transmitting an appropriately conditioned audio signal to the listening device. It should be noted, however, that since the first and second parts of the detachable connector are now physically separate from each other, the listening device cannot receive power from the host device in any form. Therefore, the length of time that the listening device can wirelessly receive and process the wirelessly transmitted audio signal can be quite limited (on the order of about 30 minutes to about 60 minutes). In order to receive power, the listening device can be re-connected to the host device using the detachable connector. Once the host device detects that the listening device is physically connected to the host device by way of the corded portion, the host device can immediately disable the wireless module and commence sending the audio signal in a wired manner by way of the corded portion.

These and other embodiments are discussed below with reference to FIGS. 1-10. However, those skilled in the art will readily appreciate that the detailed description given herein with respect to these figures is for explanatory purposes as the invention extends beyond these limited embodiments.

FIG. 1 is a block diagram of media apparatus 10 in an attached configuration in accordance with the described embodiments. Media apparatus 10 can be in communication with media player 100. In this particular example, media player 100 can be a very small form factor media player along the lines of a iPod Nano™ manufactured by Apple Inc. of Cupertino, Calif. In this case, the number of electrical components incorporated within housing 102 of media player 100 can be quite limited but nonetheless can provide an end user a large selection of media files. In the attached configuration, media player 100 can be attached to listening device 200. In this embodiment, listening device 200 can have a single component that can take the form of an ear bud that can be easily accommodated into one of an end user's ears. Listening device 200 can be attached to and electrically connected with media player 100 using corded portion 300 by way of detachable connector 400. Detachable connector 400 can include an attachment mechanism used to mechanically connect listening device 200 and corded portion 300. In one embodiment, detachable connector 400 can rely upon mechanical fasteners such as a clip. In another embodiment, detachable connector 400 can rely upon a magnetic attachment mechanism to attach corded portion 300 and listening device 200. Detachable connector 400 can also include an electrical connector that can provide an electrical coupling between listening device 200 and media player 100 by way of corded portion 300.

Media player 100 can include processor 104 (e.g., CPU or microprocessor) configured to execute instructions and to carry out operations associated with media player 100. For example, using instructions retrieved for example from memory, processor 104 can control the reception and manipulation of input and output data between components of media player 100. In most cases, processor 104 can execute instructions under the control of an operating system or other software. Processor 104 can be a single-chip processor or can be implemented with multiple components. Media player 100 can include a number of sensors that can be used to detect certain aspects of an operating environment of media player 100. For example, media player 100 can include connection sensor 106 arranged to detect whether or not media apparatus 10 is configured in an attached or an unattached state. In other words, connection sensor 106 can detect if listening device 200 is physically attached to media player 100 by way of corded portion 300. For example, when connection sensor 106 detects that listening device 200 is attached to corded portion 300, then media player 100 can respond by sending power from battery 108 (or external power from cable 112 via power supply 110) to listening device 200 thereby greatly extending an amount of time that listening device 200 can be active. For example, connection sensor 106 can determine if listening device 200 is connected to corded portion 300 by simply performing an electrical measurement by providing a test voltage or current corded portion 300. A resulting voltage or current will indicate if corded portion 300 is connected to listening device 200. For example, a resulting voltage or current consistent with an open circuit will indicate that corded portion 300 and listening device 200 are not attached to each other, and vice versa.

Figure 2:
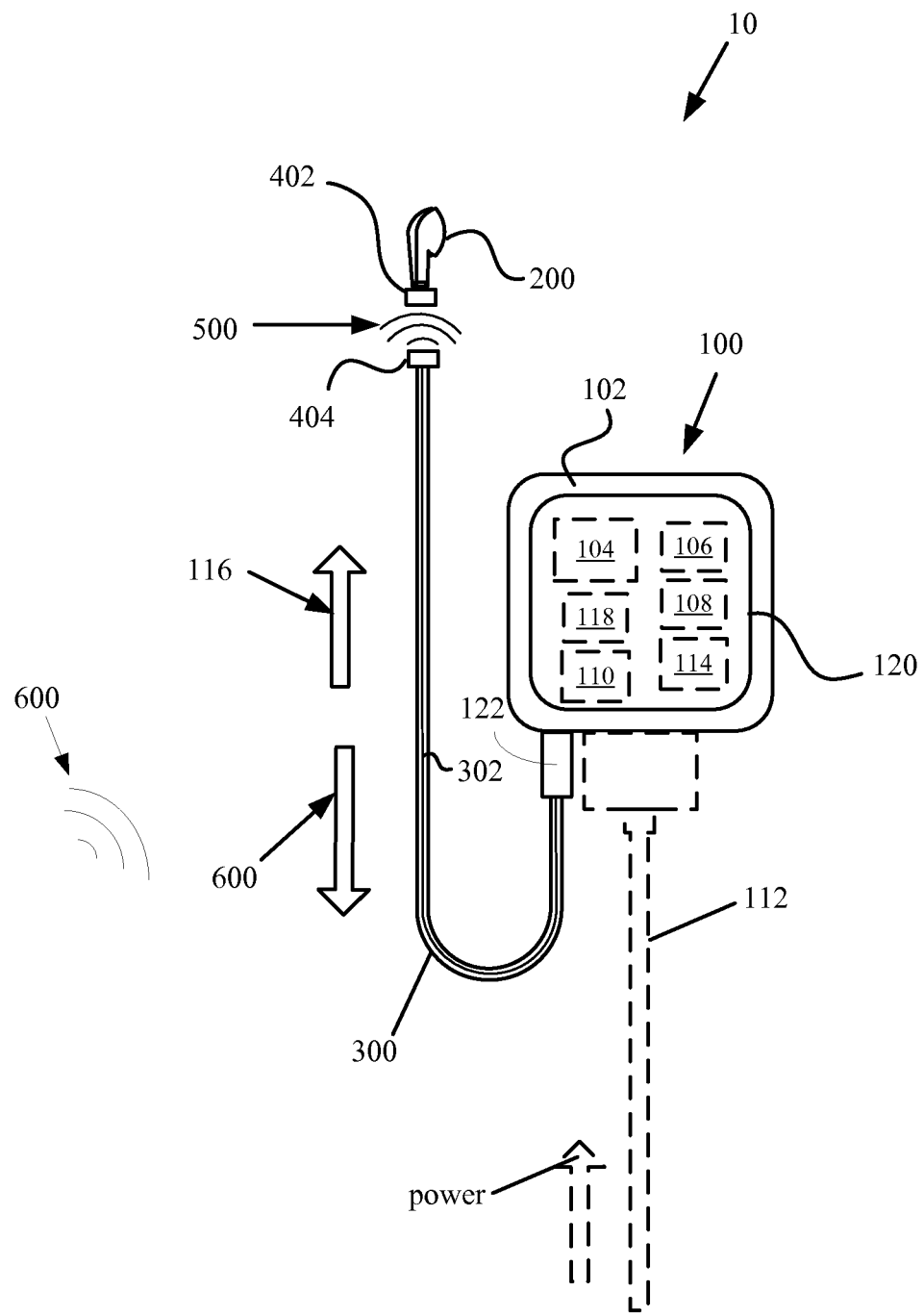
FIG. 2 shows the system of FIG. 1 in a detached state in accordance with the described embodiments.

On the other hand, when connection sensor 106 detects that listening device 200 is not attached to corded portion 300 as shown in FIG. 2, then there is no direct electrical connection between media player 100 and listening device 200. In this case, the transfer of power from battery 108 or power supply 110 to listening device 200 is paused. Media player 100 can also respond to connection sensor 106 detecting that listening device 200 is not attached to corded portion 300 by activating wireless circuit 114. In this way, audio signal 116 can be wirelessly sent from media player 100 to listening device 200 by way of wireless transmission 500 using any suitable wireless protocol such as BlueTooth™, WiFi™, and so on. Accordingly, detachable connector 400 can include first part 402 coupled to listening device 200 and second part 404 coupled to corded portion 300. In this way, first part 402 can receive wireless transmission 500 transmitted by second part 404.

Returning to FIG. 1, processor 104 together with an operating system can operate to execute computer code and produce and use data. The computer code and data can reside within data storage block 118 that is operatively coupled to the processor 104. Data storage block 118 generally provides a place to store or retain data that is being used by media player 100 as well as in some embodiments system 10 as a whole. By way of example, data storage block 118 may include Read-Only Memory (ROM), Random-Access Memory (RAM), flash memory and/or the like. As is generally well known, RAM is used by processor 104 as a general storage area and as scratch-pad memory, and can also be used to store input data and processed data. ROM can be used to store instructions or program code followed by the processor as well as other data.

In one embodiment, data storage block 118 can be configured to store media assets. The media assets can include multi-media data along the lines of digital audio data (such as MP3) and digital video data for processing by processor 104. Aspects of the media assets can include playlist(s) that can also be stored in storage block 118. In one embodiment, the playlist can be accessed through a user interface. The user interface can take the form of a mechanical switch or can be presented visually in the form of a graphical user interface, or GUI, in which case media player 100 can include display 120 for visually displaying media asset metadata (title, genre, etc.) as part of the GUI. User input at the GUI can be tactile when display 120 is capable of sensing and responding to touch inputs provided by the end user.

In some instances, media player 100 can be connected to external circuitry by way of cable/connector arrangement 112 (or more simply cable 112) that can transport both information and/or power. When media player 100 and cable 112 are connected together and power is being received by media player 100 from the external circuit, then power supply 110 can receive the external power. Power supply 110 can then send a portion of the received power directly to battery 108 if needed to maintain battery 108 at a suitable state of charge. Power supply 110 can also send a portion of the received power to listening device 200 by way of corded portion 300 only when listening device 200 is attached to corded portion 300. In all situations, however, an amount of power required for media player 100 to operate at a desired operating state can be allocated by power supply 110.

Corded portion 300 can include both structural elements used to provide structural support for corded portion 300 and any accessory (such as listening device 200) attached thereto. Corded portion 300 can be coupled with portable media player 100 at data port 122 arranged to facilitate a communication channel between portable media player 100 and corded portion 300. Corded portion 300 can also include electrical conductor 302 formed of electrically conductive material such as copper or aluminum that can be used to transport electrical power received from media player 100. In those instances where media player 100 is receiving power from the external circuit by way of cable 112, power supply 110 can provide power to listening device 200 by way of electrical conductor 302. On the other hand, when media player 100 is operating in battery mode when cable 112 is simply not connected to media player 100 as in a fully portable mode of operation (as noted by the dotted line), then battery 108 can provide power to listening device 200 by way of electrical conductor 302.

In addition to providing a path to transport power from media player 100 to listening device 200, electrical conductor 302 can act as an RF antenna suitable for receiving RF signal 600 transmitted by a remote RF transmitter. RF signal 600 can take many forms. RF signal 600 can be an FM radio transmission, an AM radio transmission, or any combination thereof. RF signal 600 can be passed by way of electrical connector 302 to an RF circuit for processing. It should be noted that due to the small amount of available space in housing 102, the RF circuit is presumed to be part of processor 104. However, it should be noted the RF circuit can be a separate component especially in those situations where more space is available. In any case, the RF circuit can process RF signal 600 to provide a processed RF signal that can be used by media player 100 to send an appropriate audio signal to listening device 200 for presentation to the end user. For example, when RF signal 600 is an FM radio signal, then the RF circuit can include FM radio signal processing circuitry such as an FM tuner. In this way, information (music, talk, songs, etc.) associated with FM radio signal 600 can be presented by listening device 200. It should be noted that when corded portion 300 is not connected to listening device 200, corded portion 300 can still serve its function as RF antenna. Accordingly, it would be beneficial to place corded portion 300 in a position such that it still is able to receive RF signal 600 but does not present a distraction to the end user. For example, when not connected to listening device 200, corded portion 300 can be wrapped around media player 100 and placed in an inconspicuous location such as a pocket but still retain the ability to receive RF signal 600 and wirelessly transmit audio signal 116 via wireless signal 500. In some embodiments, media player 100 can include a retaining mechanism that can retrieve corded portion 300 in such a way as to maintain its RF functionality but not present a distraction to the end user.

FIG. 3A is a side view of a representative embodiment of detachable connector 400 showing the relative positions of first part 402 and second part 404. As shown, first part 402 can be connected to listening device 200 whereas second part 404 can be connected to corded portion 300. The attachment between first part 402 and second part 404 can take many forms. In one embodiment, the attachment can be mechanical in nature using, for example, a clip or other suitable fastener. In another embodiment as shown in FIG. 3B, the attachment between first part 402 and second part 404 can rely upon magnetic attachment provided by net attractive force generated by magnetic elements of opposing polarities.

FIG. 3B shows a cross sectional view of magnetic detachable connector 700 in accordance with an embodiment of the invention. First part 402 and second part 404 of magnetic detachable connector 700 can include exterior insulation layer 702 surrounding magnetic element layer 704. In the described embodiment, magnetic element layer 704 can have a first magnetic polarity (i.e., either North or South). It should be noted however that in order for magnetic detachable connector 700 to provide the appropriate magnetic attachment, the magnetic polarities of the magnetic element layers in the first part 402 and the second part 404 must be opposite to each other in order to generate an appropriate magnetic attractive force between them. It should be noted that magnetic element layers 702 and 704 can include a plurality of individual magnetic elements arranged in complementary patterns. Interior insulation layer 706 can be used to provide both structural support for detachable connector 700 but also help to electrically insulate electrical conductor 708.

Figure 4:
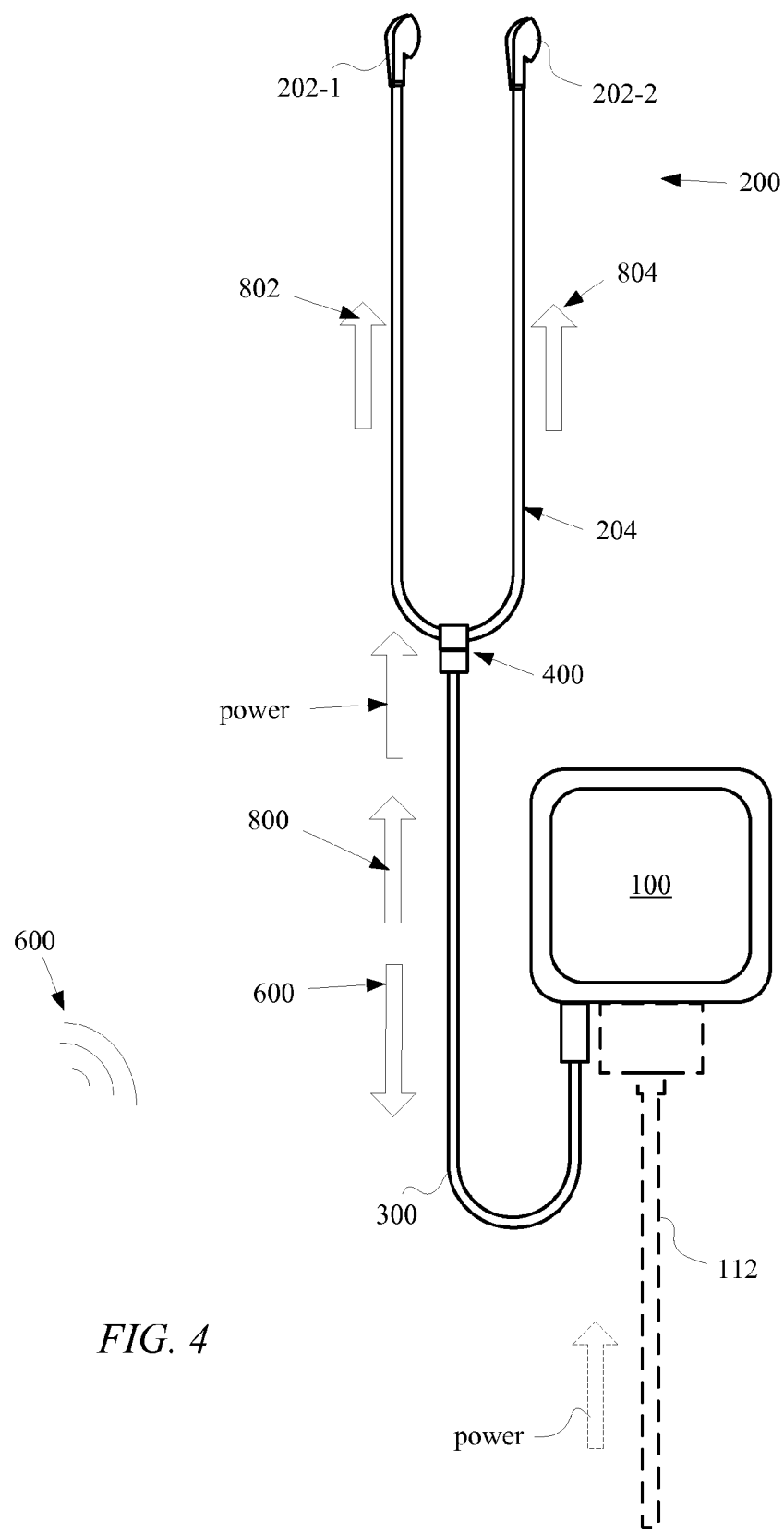
FIG. 4 shows a multi-channel media apparatus in an attached configuration in accordance with the described embodiments.

FIG. 4 shows another embodiment of media apparatus 10 in which listening device 200 includes first channel listening component 202-1 and second channel listening component 202-2 (where "-1" and "-2" indicate first channel and second channel, respectively) connected to each other by way of cord 204. Using this arrangement, media player 100 can provide multi-channel audio signal 800. Multi-channel audio signal 800 can include first channel signal 802 and second channel signal 804. In this embodiment, media player 100 can have additional functionality that can respond to connection sensor 106 detecting that media player 100 is connected to listening device 200 by providing multi-channel signal 800. Multi-channel signal 800 can be simply a two channel signal (i.e., Left or Right). For example, first channel signal 802 and second channel signal 804 can be combined by media player 100 to form multi-channel signal 800 using any number of well-known signal combining techniques where each signal can include an identifier. The identifier can be used by first channel listening component 202-1 and second channel listening component 202-2 to identify the appropriate portion of multi-channel signal 800 corresponding to first channel signal 802 and second channel signal 804. In another embodiment, first channel signal 802 and second channel signal 804 can take the form of data packets where the identifier can be part of a packet header. It should be noted that in some cases, media player 100 can simply provide a single channel signal to listening device 200 in which case first channel listening device 202-1 and second channel listening device 202-2 will provide essentially the same audio output.

Figure 5:
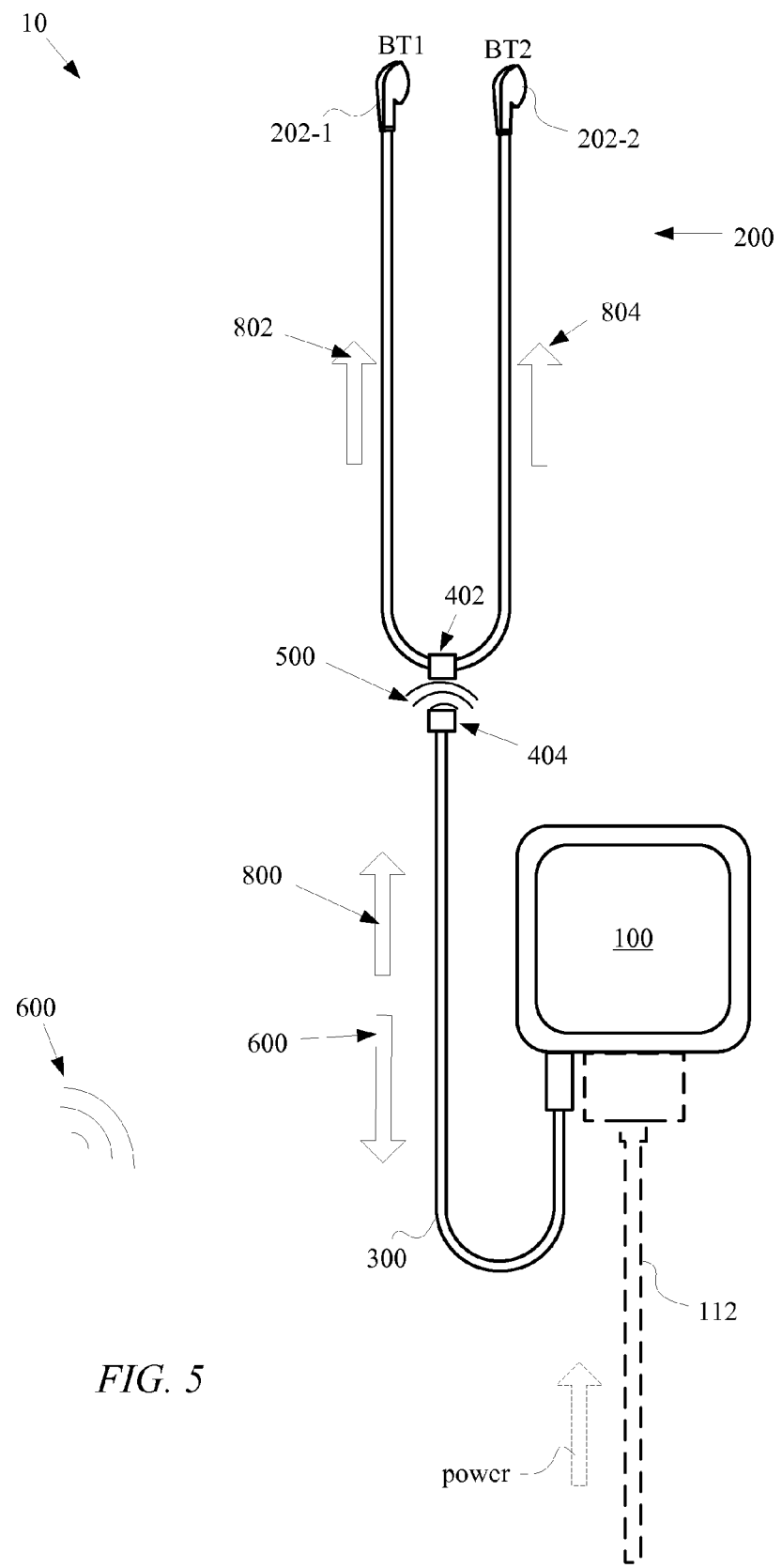
FIG. 5 shows the multi-channel media apparatus of FIG. 4 in an unattached configuration.

FIG. 5 shows an embodiment of listening device 200 in an unattached configuration in which wireless signal 500 can provide multi-channel signal 800. For example, when wireless signal 500 is based upon the BlueTooth™ wireless protocol, first channel listening device 202-1 can have a unique BT address (i.e., BT1) and second channel listening device 202-2 can have its own unique BT address (i.e., BT2). In this way, BT wireless signal 500 can be used to provide first channel signal 802 to first listening device 202-1 and second channel signal 804 to second listening device 202-2.

Figure 6A:
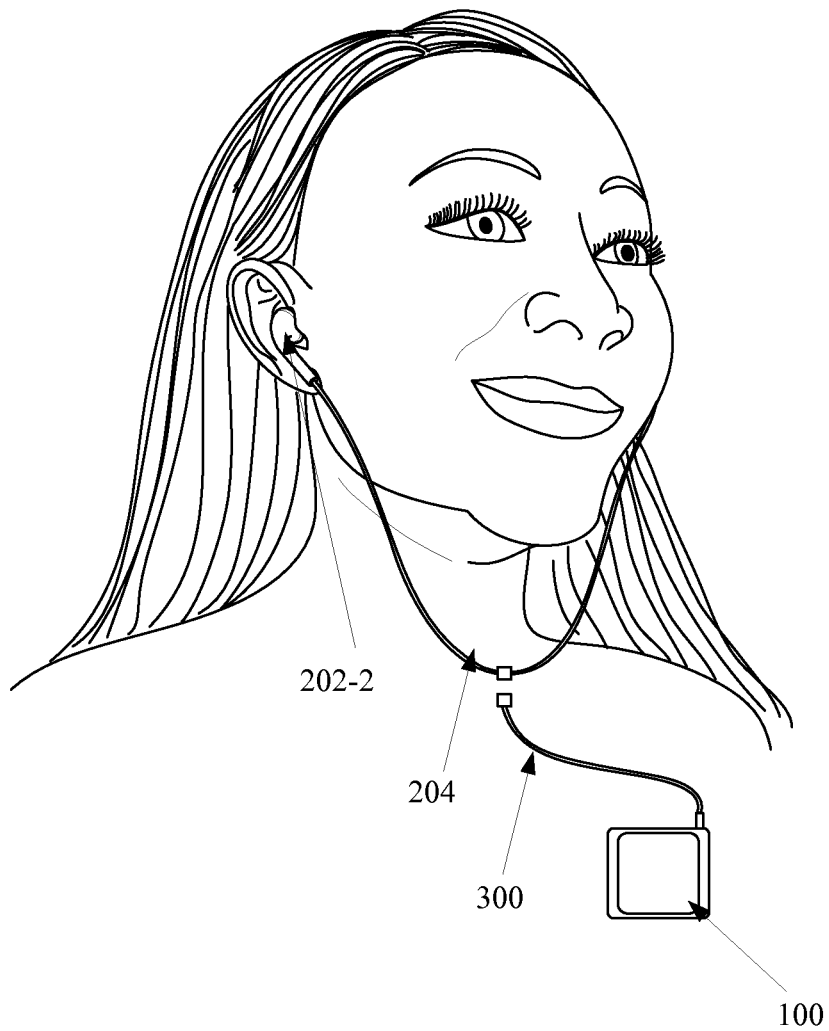
FIGS. 6A and 6B show an end user wearing the multi-channel media apparatus shown in FIG. 5.
Figure 6B:
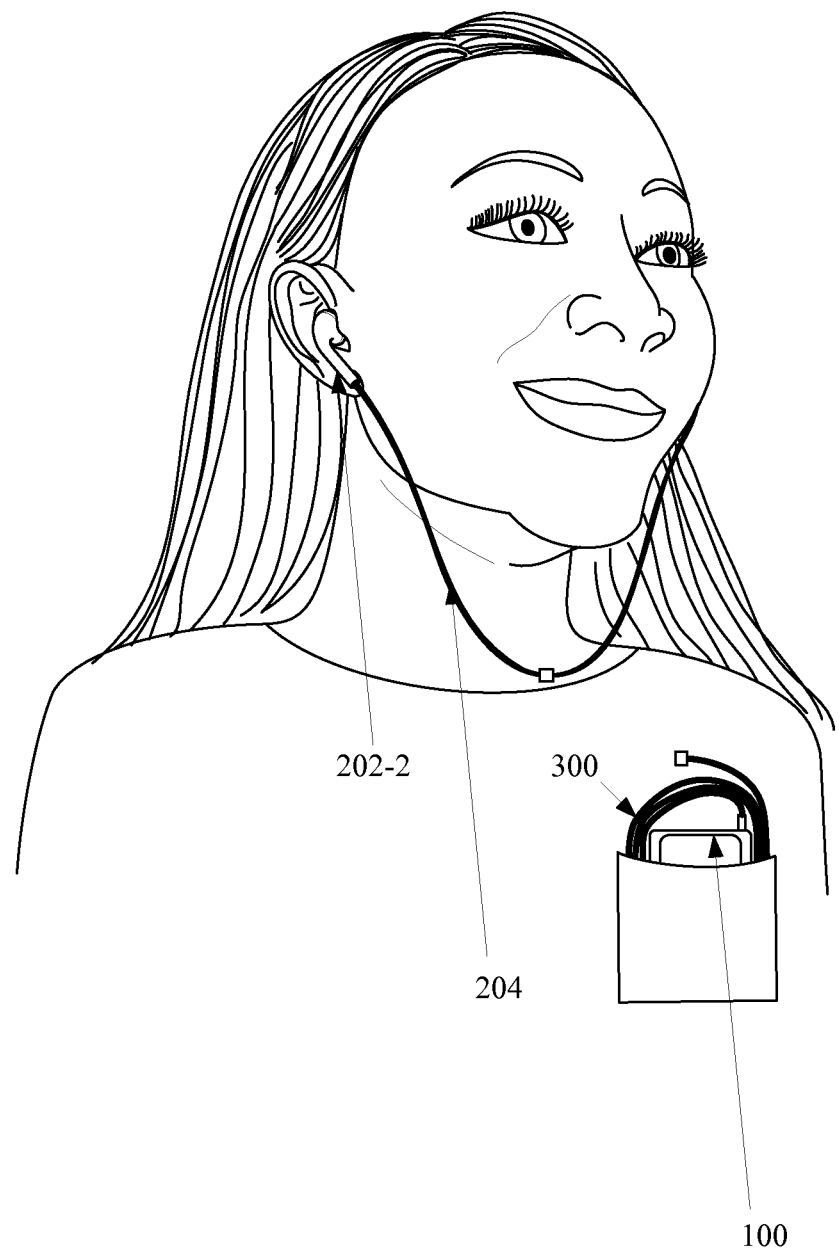

FIG. 6A shows an arrangement whereby media apparatus 10 can operate in the wireless mode. In this arrangement, media player 100 can be placed in any location that the end user finds convenient. For example, as shown in FIG. 6B, corded portion 300 can be wrapped about portable media player 100 and placed in an inconspicuous location such as a pocket. In this way, corded portion 300 still retains the ability to receive RF signal 600 as well as wirelessly provide an audio signal to listening device 200. Accordingly, by placing corded portion 300 in the pocket, the chance that corded portion will become entangled during physical activity is practically non-existent.

Figure 7:
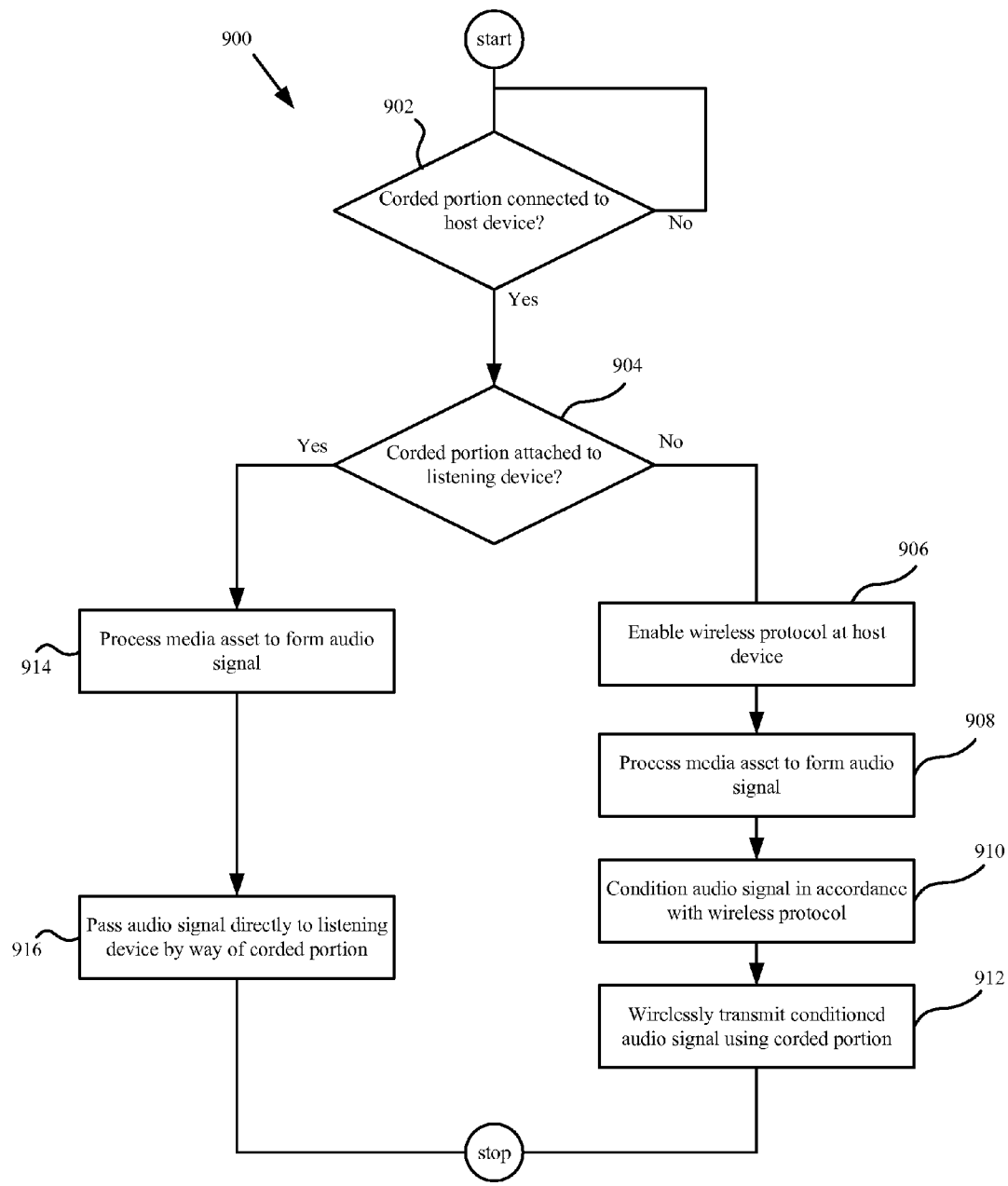
FIG. 7 shows a flowchart detailing a process for operating a media apparatus having a corded portion and at least a listening device in accordance with the described embodiments.

FIG. 7 shows a flowchart detailing process 900 for operating a media apparatus having a corded portion and at least a listening device in accordance with the described embodiments. Process 900 can start at 902 by determining if the corded portion is connected to a host device. When the corded portion is determined to be connected to the host device, then a determination is made at 904 if the corded portion is attached to a listening device. If it is determined that the corded portion is not attached to the listening device, then at 906 a wireless protocol is enabled at the host device. At 908 a media asset is processed to form an audio signal and at 910 the audio signal is conditioned in accordance with the wireless protocol. At 912 the conditioned audio signal is wirelessly transmitted using the corded portion. Returning to 904, when it is determined that the corded portion is attached to the listening device, then at 914, the media asset is processed to form the audio signal and at 916, the audio signal is passed directly to the listening device by way of the corded portion.

Figure 8:
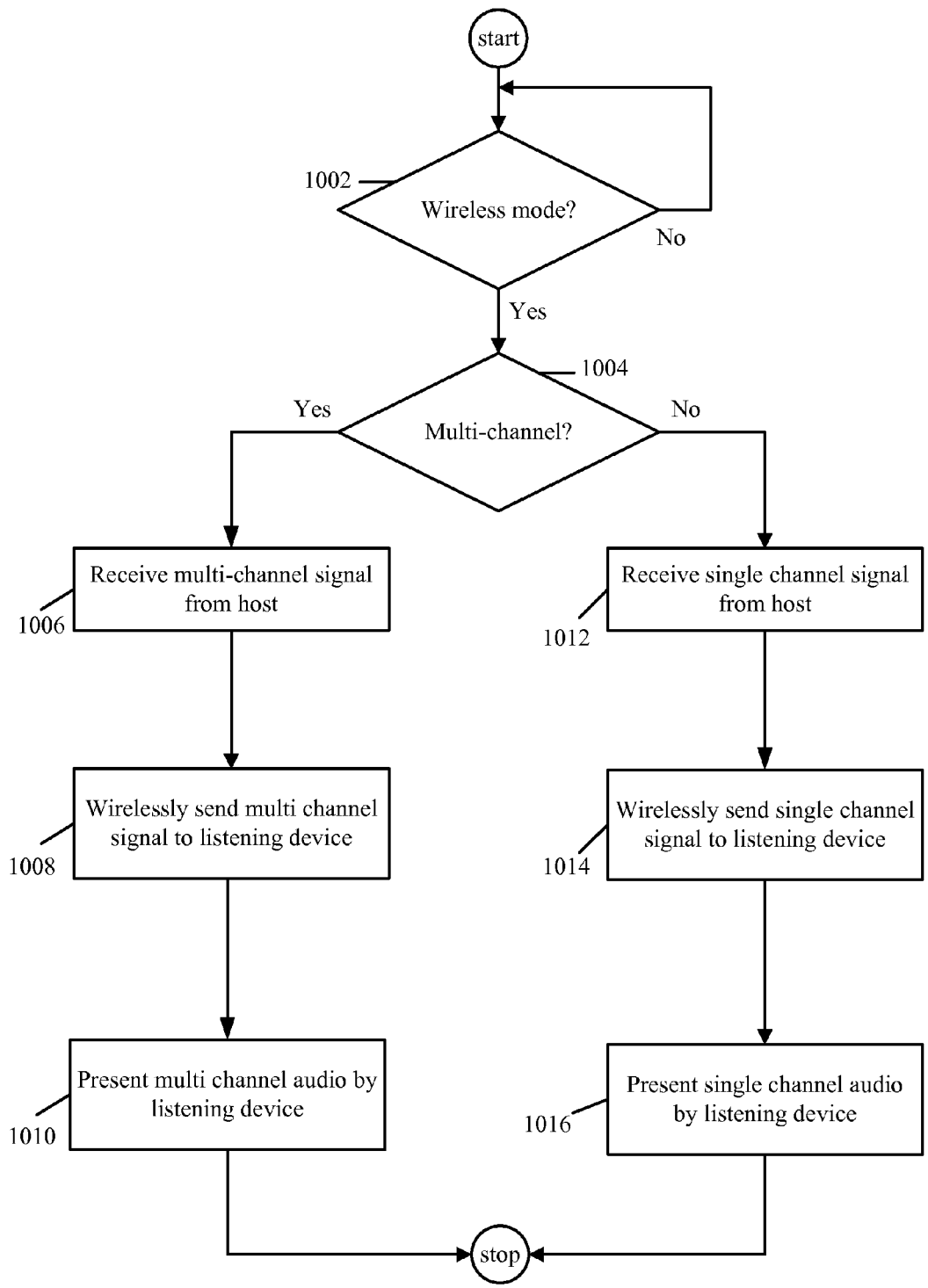
FIG. 8 shows a flowchart detailing a process for operating a multi-channel media apparatus having a host device optionally operable in multi-channel mode, a corded portion, and a multi-channel listening device having at least two individual listening components.

FIG. 8 shows a flowchart detailing process 1000 for operating a multi-channel media apparatus having a host device optionally operable in multi-channel mode, a corded portion, and a multi-channel listening device having at least two individual listening components. Process 1000 can be performed by determining if the host device is operating in a wireless transmission mode at 1002. When the host device is operating in a wireless transmission mode, then at 1004, a determination is made if the listening device is capable of multi-channel processing. If the listening device is capable of multi-channel processing, then at 1006 a multi-channel signal is received at the corded portion from the host device at 1006. The multi-channel signal is then wirelessly sent to the listening device at 1008 and at 1010, a multi-channel audio is presented by the listening device. Returning to 1004, when it is determined that the listening device is not multi-channel capable, then at 1012 a single channel audio signal is received at the corded portion. At 1014, the single channel audio signal is wirelessly sent to the listening device and at 1016, the listening device presents the single channel audio.

Figure 9:
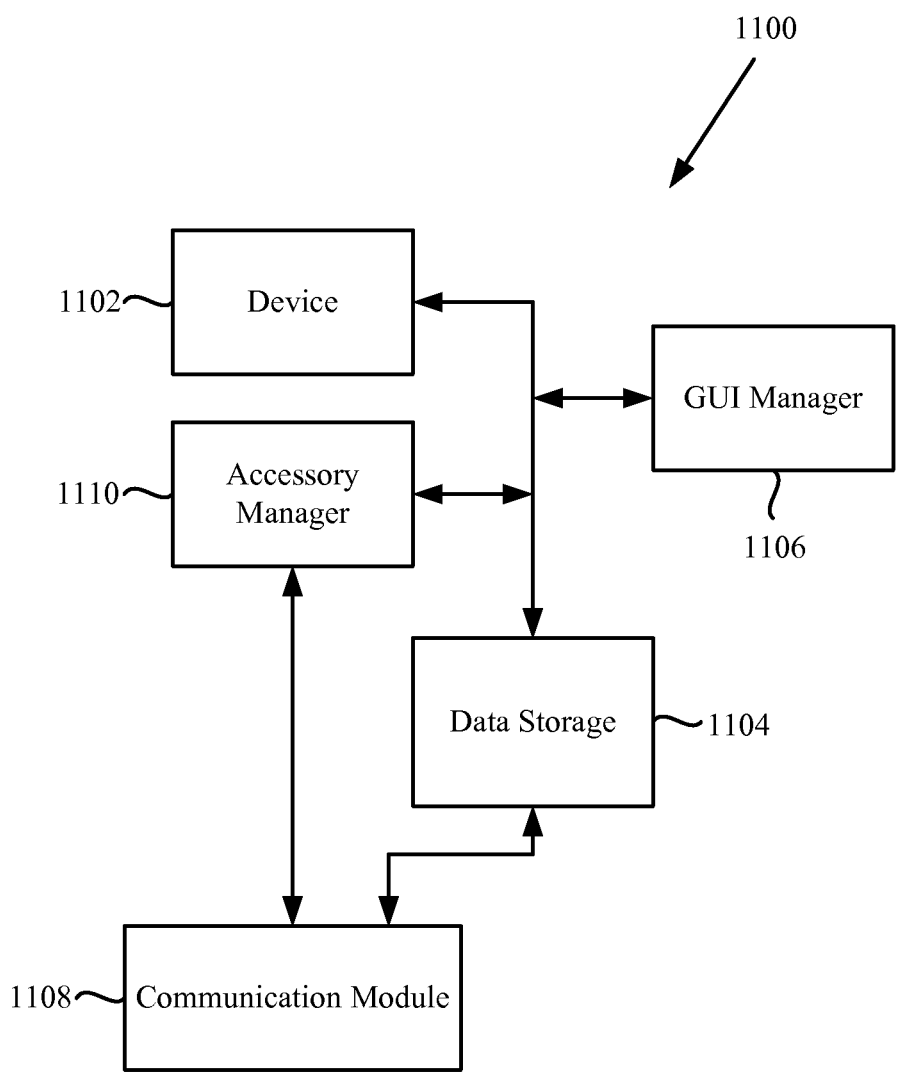
FIG. 9 is a block diagram of an arrangement of functional modules utilized by a portable media device.

FIG. 9 is a block diagram of an arrangement 1100 of functional modules utilized by a portable media device. The portable media device can, for example, be the portable communication device 100 illustrated in FIG. 1. The arrangement 1100 includes a media player 1102 that is able to output media for a user of the portable media device but also store and retrieve data with respect to data storage 1104. The arrangement 1100 also includes a graphical user interface (GUI) manager 1106. The GUI manager 1106 operates to control information being provided to and displayed on a display device. The arrangement 1100 also includes communication module 1108 that facilitates communication between the portable media device and an accessory device. Still further, arrangement 1100 includes an accessory manager 1110 that operates to authenticate and acquire data from an accessory device that may be coupled to the portable media device. For example, the accessory device can be a wireless interface accessory, a wired interface accessory or any other suitable type interface accessory.

Figure 10:
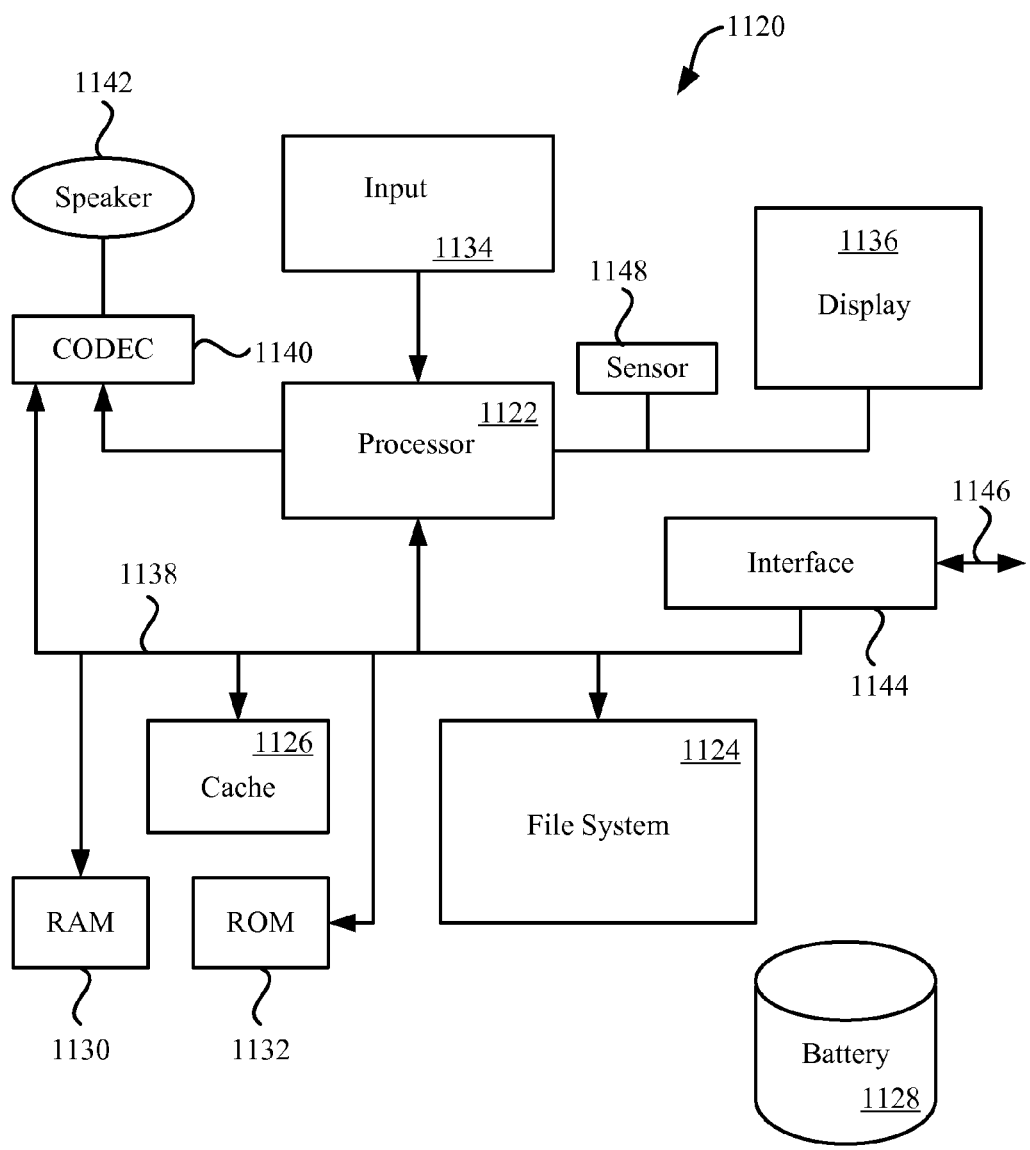
FIG. 10 is a block diagram of media player in accordance with the described embodiments.

FIG. 10 is a block diagram of media player 1120 in accordance with the described embodiments. The media player 1120 illustrates circuitry of a representative portable media device. Media player 1120 includes a processor 1122 that pertains to a microprocessor or controller for controlling the overall operation of the media player 1120. The media player 1120 stores media data pertaining to media items in a file system 1124 and a cache 1126. The file system 1124 is, typically, a storage disk or a plurality of disks. The file system 1124 typically provides high capacity storage capability for the media player 1120. However, since the access time to the file system 1124 is relatively slow, the media player 1120 can also include a cache 1126. The cache 1126 is, for example, Random-Access Memory (RAM) provided by semiconductor memory. The relative access time to the cache 1126 is substantially shorter than for the file system 1124. However, the cache 1126 does not have the large storage capacity of the file system 1124. Further, the file system 1124, when active, consumes more power than does the cache 1126. The power consumption is often a concern when the media player 1120 is a portable media player that is powered by a battery 1128. The media player 1120 also includes a RAM 1130 and a Read-Only Memory (ROM) 1132. The ROM 1132 can store programs, utilities or processes to be executed in a non-volatile manner. The RAM 1130 provides volatile data storage, such as for the cache 1126.

The media player 1120 also includes a user input device 1134 that allows a user of the media player 1120 to interact with the media player 1120. For example, the user input device 1134 can take a variety of forms, such as a button, keypad, and dial, touch pad or screen. Still further, the media player 1120 includes a display 1136 (screen display) that can be controlled by the processor 1122 to display information to the user. A data bus 1138 can facilitate data transfer between at least the file system 1124, the cache 1126, the processor 1122, and the CODEC 1140.

In one embodiment, the media player 1120 serves to store a plurality of media assets (e.g., songs, podcasts, etc.) in the file system 1124. The media assets can pertain to one or more different types of media content. In one embodiment, the media assets are audio tracks (e.g., songs, audiobooks, and podcasts). In another embodiment, the media assets are images (e.g., photos) and/or video data. However, in other embodiments, the media assets can be any combination of audio, graphical or video content. When a user desires to have the media player play a particular media item, a list of available media items is displayed on the display 1136. Then, using the user input device 1134, a user can select one of the available media items. The processor 1122, upon receiving a selection of a particular media item, supplies the media data (e.g., audio file) for the particular media item to a coder/decoder (CODEC) 1140. The CODEC 1140 then produces analog output signals for a speaker 1142. The speaker 1142 can be a speaker internal to the media player 1120 or external to the media player 1120. For example, headphones or earphones that connect to the media player 1120 would be considered an external speaker. The media player 1120 also includes a network/bus interface 1144 that couples to a data link 1146. The data link 1146 allows the media player 1120 to couple to a host computer or to accessory devices. The data link 1146 can be provided over a wired connection or a wireless connection. In the case of a wireless connection, the network/bus interface 1144 can include a wireless transceiver. Sensor 1148 can be used to detect various external stimuli such as ambient light, temperature, pressure, and so on.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The many features and advantages of the presently described embodiments are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A media apparatus, comprising:
   a listening device having a first earbud, a second earbud, and a connection cord electrically connecting the first earbud and the second earbud, wherein the connection cord includes a connection cord length;

a transmission cord having a first transmission cord end and a second transmission cord end, wherein the transmission cord transmits an audio signal provided by a host device from the first transmission cord end to the second transmission cord end; and
    a detachable connector comprising:
        a first connector part attached to the connection cord along the connection cord length between the first earbud and the second earbud, the first connector part including a first attachment mechanism part, a first electrical contact, and a wireless receiver, and
        a second connector part attached to the transmission cord at the second transmission cord end, the second connector part including a second attachment mechanism part, a second electrical contact, and a wireless transmitter,
        wherein the attachment mechanism parts detachably connect the first connector part with the second connector part such that:
            when the first attachment mechanism part is attached to the second attachment mechanism part, the transmission cord passes the audio signal from the first transmission cord end to the second electrical contact and the second electrical contact passes the audio signal to the first electrical contact, and
            when the first attachment mechanism part is detached from the second attachment mechanism part, the transmission cord passes the audio signal conditioned in accordance with a wireless transmission protocol from the first transmission cord end to the wireless transmitter and the wireless transmitter wirelessly passes the conditioned audio signal to the wireless receiver.

2. The media apparatus as recited in claim 1, wherein the transmission cord includes an antenna between the first transmission cord end and the second transmission cord end to receive a radio frequency (RF) signal transmitted by an external RF transmitter and to pass the received RF signal to the first transmission cord end for processing by the host device to form the audio signal.

3. The media apparatus as recited in claim 2, wherein when the first attachment mechanism part is detached from the second attachment mechanism part, the transmission cord is retained at the host device in such a way that the transmission cord receives the RF signal transmitted by the external RF transmitter and wirelessly transmits to the wireless receiver the audio signal conditioned in accordance with the wireless transmission protocol from the second connector part at the second transmission cord end to the first connector part along the connection cord length between the first earbud and the second earbud.

4. The media apparatus as recited in claim 3, further comprising:
    an attachment detector, the attachment detector arranged to detect whether the first attachment mechanism part is attached to the second attachment mechanism part by providing an electrical test signal at the transmission cord and determining whether the first attachment mechanism part is attached to the second attachment mechanism part based upon a return signal in response to the electrical test signal.

5. The media apparatus as recited in claim 1, wherein when the audio signal includes a multi-channel audio signal comprising a first audio channel signal associated with a first audio channel and a second audio channel signal associated with a second audio channel, the first earbud receives the first audio channel signal and presents the first audio channel, and the second earbud receives the second audio channel signal and presents the second audio channel.

6. The media apparatus of claim 1, wherein at least one of the first connector part or the second connector part includes a magnetic element, wherein the magnetic element is separated from the respective electrical contact by an insulation layer, and wherein the magnetic element provides a magnetic attachment between the first connector part and the second connector part when the first connector part is attached to the second connector part.

7. A portable media device, comprising:
    a processor;
    a data store arranged to retain a media item, the processor arranged to process the media item to form an audio signal;
    a wireless transmission module arranged to condition the audio signal in accordance with a wireless transmission protocol to form a wireless signal;
    a data port, the data port arranged to receive a transmission cord having a first transmission cord end and a second transmission cord end, wherein the data port outputs at least one of the audio signal or the wireless signal to the first transmission cord end; and
    an attachment detector, the attachment detector arranged to detect a connection status, wherein the connection status indicates whether a first connector part of a detachable connector is attached to a second connector part of the detachable connector, wherein the first connector part is attached to a connection cord electrically connecting a first earbud and a second earbud of a listening device, and wherein the second connector part is attached to the second transmission cord end of the transmission cord;
    wherein the processor, in response to receiving the connection status indicating whether the first connector part is attached to the second connector part, instructs the wireless transmission module, such that:
        when the first connector part is attached to the second connector part, the wireless transmission module does not condition the audio signal and the transmission cord passes the audio signal to the connection cord, and
        when the first connector part is detached from the second connector part, the wireless module conditions the audio signal in accordance with the wireless transmission protocol and the transmission cord passes the wireless signal wirelessly to a wireless receiver along the connection cord of the unattached listening device.

8. The portable media device, as recited in claim 7, wherein the attachment detector is configured to provide an electrical test signal and to determine whether the transmission cord is attached to the listening device based upon a signal returned in response to the electrical test signal.

9. The portable media device as recited in claim 8, further comprising:
    a power supply arranged to receive power from an external power supply by way of a cable, the cable being optionally coupled to the portable media device.

10. The portable media device as recited in claim 9, wherein when the attachment detector detects that the transmission cord is connected to the listening device and the power supply is receiving external power, then the processor instructs the power supply to provide power to the listening device by way of the transmission cord.

11. The portable media device as recited in claim 10, wherein when the listening device is receiving the wireless transmission, the transmission cord is wrapped about the portable media device.

12. The portable media device as recited in claim 11, wherein the transmission cord receives an RF signal transmitted by an external RF transmitter and passes the received RF signal to the portable media device for further processing to form the audio signal.

13. A method performed by a processor in a portable media player arranged to process and store at least a media asset, comprising:
  processing a media asset by a processor to form an audio signal;
  receiving a connection status from an attachment detector, wherein the connection status indicates whether a first connector part of a detachable connector is attached to a second connector part of the detachable connector, wherein the first connector part is attached to a connection cord electrically connecting a first earbud and a second earbud of a listening device, and wherein the second connector part is attached to a transmission cord attached to a portable media player;
  instructing, by the processor in response to receiving the connection status indicating whether the first connector part is attached to the second connector part, a wireless transmission module, such that:
    when the first connector part is attached to the second connector part, the wireless transmission module does not condition the audio signal and the transmission cord passes the audio signal to the connection cord, and
    when the first connector part is detached from the second connector part, the wireless module conditions the audio signal in accordance with a wireless transmission protocol and the transmission cord passes the conditioned audio signal wirelessly to the connection cord.

14. The method as recited in claim 13, further comprising:
  disabling, by the processor in response to the connection status indicating that the portable media player is connected to the listening device, the wireless transmission module; and
  providing the audio signal directly to the listening device using the transmission cord.

15. The method as recited in claim 14, further comprising:
  determining whether the listening device is multi-channel capable;
  providing, by the processor, the audio signal as a multi-channel audio;
  conditioning the multi-channel audio signal in accordance with the wireless transmission protocol; and
  using the transmission cord to wirelessly transmit the conditioned multi-channel audio signal from the second connector part of the detachable connector at an end of the transmission cord to the first connector part of the detachable connector at the listening device.

16. A non-transitory computer readable medium storing instructions, which when executed by a data processing system of a portable media player, cause the portable media player to perform a method comprising:
  processing, by a data processing system, a media asset to form an audio signal;
  receiving a connection status from an attachment detector, wherein the connection status indicates whether a first connector part of a detachable connector is attached to a second connector part of the detachable connector, wherein the first connector part is attached to a connection cord electrically connecting a first earbud and a second earbud of a listening device, and wherein the second connector part is attached to a transmission cord attached to a portable media player;
  conditioning, by a wireless transmission module in response to receiving the connection status indicating whether the first connector part is attached to the second connector part a wireless transmission protocol, such that:
    when the first connector part is attached to the second connector part, the wireless transmission module does not condition the audio signal and the transmission cord passes the audio signal to the connection cord, and
    when the first connector part is detached from the second connector part, the wireless module conditions the audio signal in accordance with a wireless transmission protocol and the transmission cord passes the conditioned audio signal wirelessly to the connection cord.

17. The non-transitory computer readable medium as recited in claim 16, further comprising instructions to cause the portable media player to perform the method including:
  disabling, by the data processing system in response to the connection status from the attachment detector indicating that the transmission cord attached to the portable media player is connected to the listening device, the wireless transmission module; and
  providing the audio signal directly to the listening device using the transmission cord.

18. The non-transitory computer readable medium as recited in claim 17, further comprising instructions to cause the portable media player to perform the method including:
  determining whether the listening device is multi-channel capable;
  providing, by the data processing system, the audio signal as a multi-channel audio signal;
  conditioning the multi-channel audio signal in accordance with the wireless transmission protocol; and
  using the transmission cord to wirelessly transmit the conditioned multi-channel audio signal from the second connector part of the detachable connector at an end of the transmission cord to the first connector part of the detachable connector at the listening device.

* * * * *